UNITED STATES PATENT OFFICE.

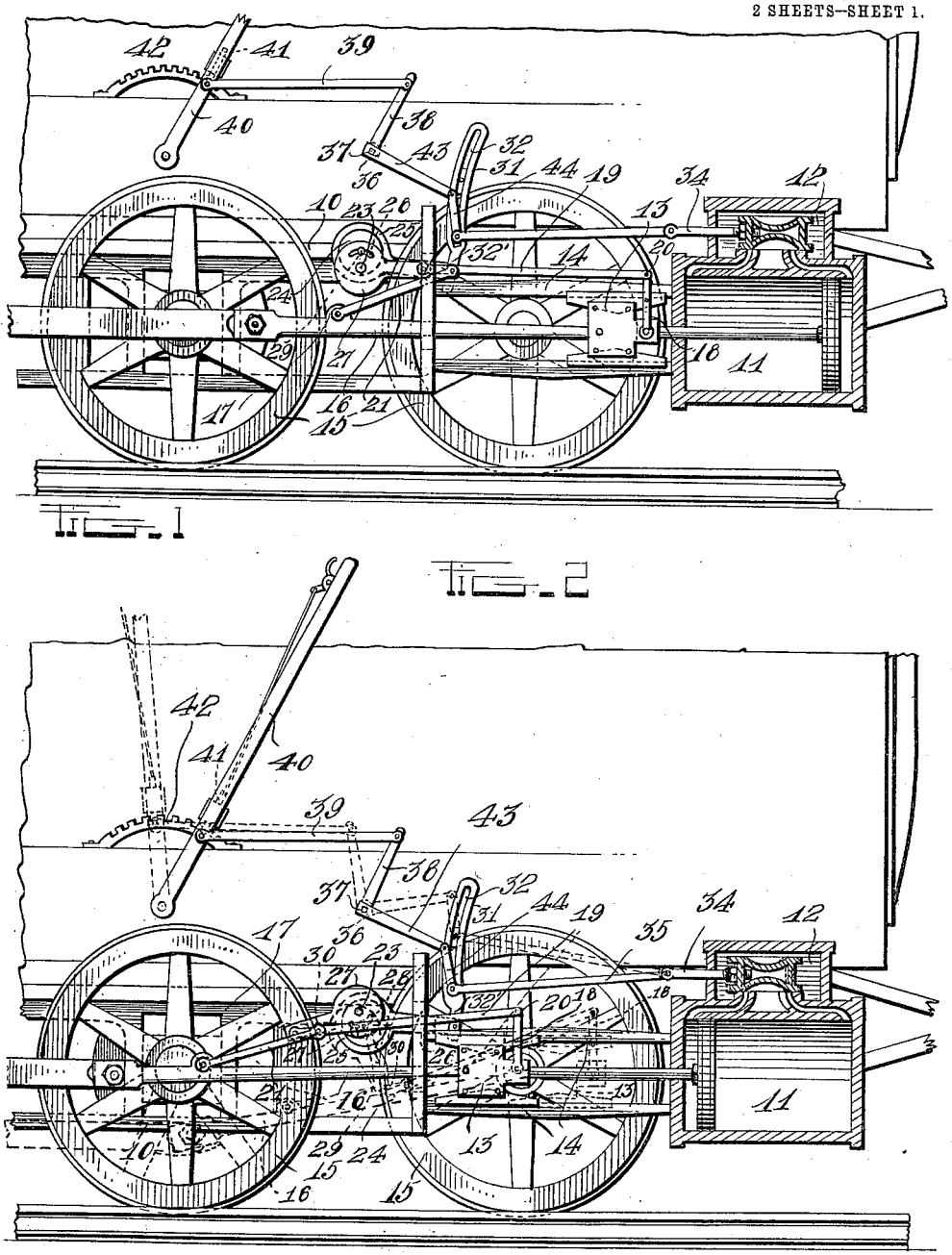

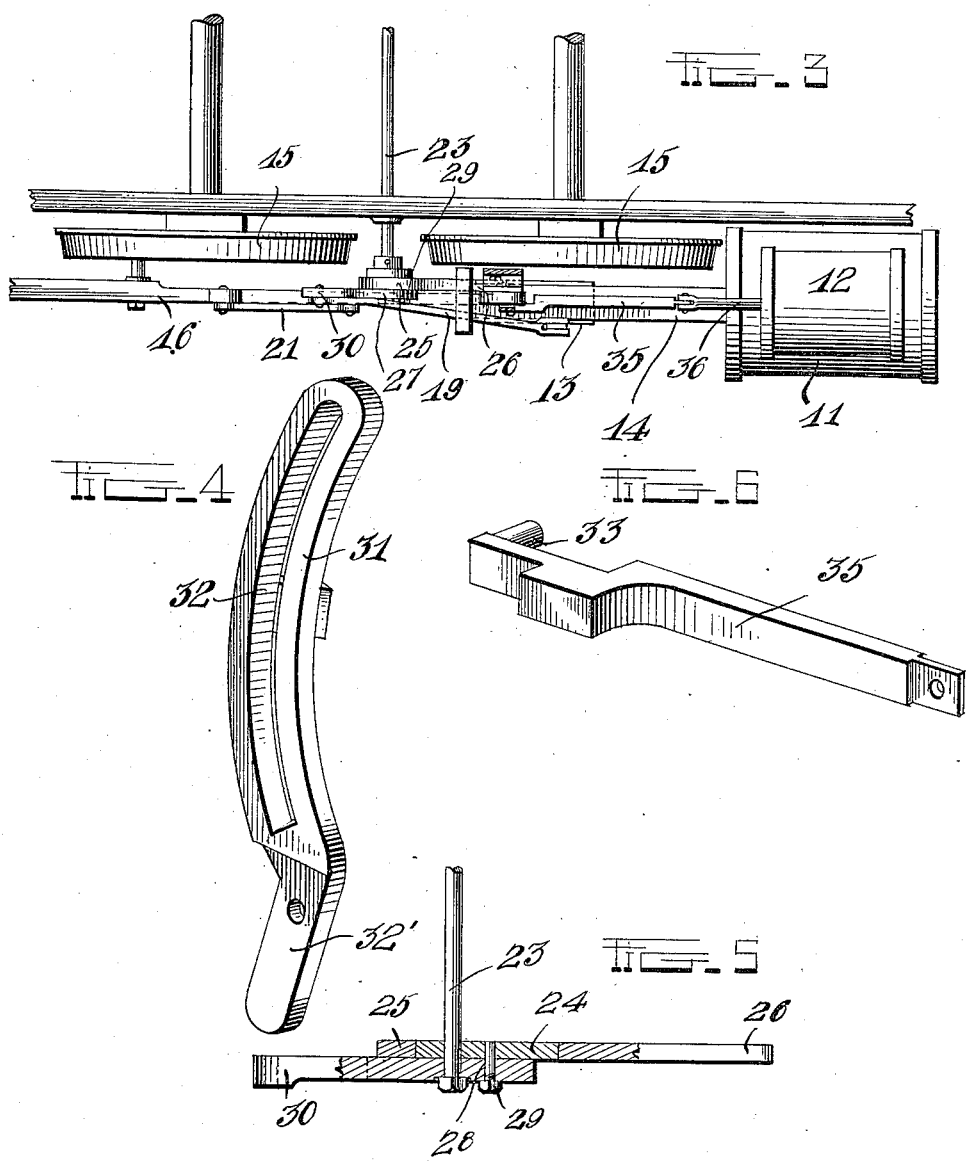

GEORGE T. SIGLER, OF HUNTINGTON, WEST VIRGINIA.

VALVE-GEAR.

1,045,085.

Specification of Letters Patent.

Patented Nov. 19, 1912.

Application filed January 18, 1912. Serial No. 671,915.

*To all whom it may concern:*

Be it known that I, GEORGE T. SIGLER, a citizen of the United States, residing at Huntington, in the county of Cabell and State of West Virginia, have invented certain new and useful Improvements in Valve-Gears, of which the following is a specification, reference being had therein to the accompanying drawing.

This invention relates to engines and has special reference to a valve gear for a locomotive engine.

The principal object of the invention is to improve the general construction of valve gears for locomotive engines.

Another object of the invention is to provide a valve gear of improved construction operated from the cross head and main rod of the engine.

With the above and other objects in view the invention consists in general of certain novel details of construction, arrangements and combinations of parts as will be hereinafter fully described, illustrated in the accompanying drawings, and specifically claimed.

In the accompanying drawings, like characters of reference indicate like parts in the several views, and:—Figure 1 is a side elevation of a portion of an engine equipped with this invention, the parts being shown with the piston at the forward end of the stroke. Fig. 2 is a similar view at the other end of the stroke. Fig. 3 is a plan view of the invention. Fig. 4 is an enlarged side elevation showing the construction of the link. Fig. 5 is a similar enlarged detail showing the construction of the eccentric. Fig. 6 is a detail perspective of a valve rod used to connect certain parts with the valve stem.

In the present embodiment of the invention, the same has been shown as applied to an engine wherein the frames are indicated at 10, the cylinder at 11, the steam chest at 12, the cross head 13, and the guides at 14. The engine is supported on the usual wheels 15 and between the cross head and the front wheels of the engine are the usual main rods 16. On each of the main rods there is provided a lug 17 for purposes to be hereinafter described. Secured to each cross head is an arm 18 whereto is connected a link 19, said link being connected at the upper end of the arm by a pivot bolt 20. Extending from a point adjacent the opposite end of this link to the lug 17 is a link 21. It will be noted that as the cross head moves backward and forward in the guide the free end of the link 19 will be caused to travel in a circle. This motion is brought about by the reciprocating movement of the pivot point of said link combined with the rotary movement of the lug on the main rod.

Mounted on the frames 10 in suitable bearings 22 is a shaft 23 at each end of which is an eccentric 24 which is surrounded by an eccentric strap 25 provided with a blade 26. Furthermore this shaft has mounted thereon at each end a disk 27 which is concentric with the shaft and which is provided with a slot 28 wherethrough passes a bolt 29, said bolt also passing through the eccentric so that the position of this disk with reference to the eccentric may be adjusted by proper manipulation of this bolt. On this disk is an arm 30 which is connected to the free end of the link 19 so that as the cross head moves backward and forward the shaft will be caused to rotate and thereby move the eccentric blade. Pivoted to each of the frames 10 is a valve motion link 31 provided with the usual slot 32 wherein moves a block 33. This block is connected to the valve stem 34 by a radius rod 35. The lower end of the link 31 is provided with an extension 32 whereto the eccentric blade is pivoted so that as the eccentric rotates the link will be oscillated, thus causing the valve to move to and fro.

Supported in suitable bearings 36 is a rock shaft 37 provided with a rock arm 38 which is connected by a reach rod 39 with a reversing lever 40 provided with the usual latch 41 working over a quadrant 42. On this rock shaft there is also provided rock arms 43 which are connected by the links 44 with the radius rods on each side of the engine.

In the operation of the device as the cross head reciprocates the eccentric shaft will be caused to rotate as previously noted. Thus, through the eccentric and its blade, will oscillate the valve motion link, and this will cause the reciprocation of the valve. By shifting the position of the link block in the link the movement of the valve may be regulated so that the cut off may be varied and by moving the block from one end to the other of the link the motion of the engine may be reversed in the usual manner.

It is to be noted that it is preferred to give the engine, in this construction, slightly more lead in the forward motion than in the reverse. It is also to be noted that by reason of the adjustability of the disk on the eccentric, valves may be set with great ease without altering the position of the eccentric on its shaft. It is thus possible to key the eccentrics firmly on their shaft without danger of slipping and without possibility of the key way wearing. There has thus been provided a simple and efficient device of the kind described, and for the purpose specified.

It is obvious that many minor changes may be made in the form and construction thereof without departing from the material principles thereof, and it is therefore not desired to confine the invention to the exact form herein shown and described but it is wished to include all such as properly come within the scope of the appended claims.

It will be obvious furthermore that in a locomotive where two cylinders are employed the same arrangement illustrated in one side will be used on the other side with the exception that the disk on the eccentric will be set quartering to the disk on the other eccentric. In this case the links 21 may be omitted since the movement of the cross head on one side will carry the arm 30 over the dead center.

Having thus described the invention, what is claimed as new, is:—

1. In a valve motion for engines having a cross head and main rod, an eccentric, an operative connection between said eccentric and the valve of the engine, a disk mounted on the eccentric shaft, an arm mounted on the cross head, a link eccentrically connecting the disk with the arm, and a second link connecting the main rod with the last mentioned link.

2. In a valve motion for engines having a cross head and main rod, an eccentric shaft, an operative connection between said eccentric shaft and the valve of the engine including an eccentric mounted on said shaft, a disk concentrically mounted on said shaft and provided with a slot concentric with the shaft, securing means passing through said slot to adjustably secure said disk on the eccentric shaft, an arm attached to the cross head, a link connecting said arm with the disk, and a second link connecting the last mentioned link with the main rod.

3. In a valve motion for engines having a cross head and main rod, an eccentric shaft, an eccentric on said shaft, a disk mounted on said eccentric and provided with an arm extending therefrom, an arm fixed to the cross head, a link connecting the disk arm with the cross head arm, a second link connecting the last mentioned link with the main rod, an eccentric strap, a blade carried by said eccentric, a slotted valve motion link pivoted for oscillation on the engine, a block in the slot of said link, a radius rod pivoted to the block, and means to move the block in the slot of the link.

In testimony whereof I hereunto affix my signature in presence of two witnesses.

GEORGE T. SIGLER.

Witnesses:
L. N. GILLIS,
U. T. MENGERT.

---

Copies of this patent may be obtained for five cents each, by addressing the "Commissioner of Patents, Washington, D. C."